United States Patent [19]

Sutton

[11] 4,210,170

[45] Jul. 1, 1980

[54] ANTI-CAVITATION AND OVERLOAD RELIEF VALVE FOR A HYDRAULIC SYSTEM

[75] Inventor: Sutton, Kalamazoo, Mich.

[73] Assignee: General Signal Corporation, Stamford, Conn.

[21] Appl. No.: 879,026

[22] Filed: Feb. 17, 1978

[51] Int. Cl.[2] .............................................. F16K 17/18

[52] U.S. Cl. .................................. 137/493.4; 91/441; 91/451; 137/493.5

[58] Field of Search ................. 91/451, 452, 468, 441; 137/493.3, 493.4, 493.5, 493.6

[56] References Cited

U.S. PATENT DOCUMENTS

| | | | |
|---|---|---|---|
| 115,982 | 6/1871 | Porteous . | |
| 977,736 | 12/1910 | Hanson | 137/493.4 |
| 1,229,885 | 6/1917 | Chadwick . | |
| 1,326,124 | 12/1919 | Vischer . | |
| 3,112,763 | 12/1963 | Tennis | 137/493.5 |
| 3,125,117 | 3/1964 | Borgard | 137/493.4 |
| 3,554,214 | 1/1971 | Stenlund . | |
| 3,604,450 | 9/1971 | Botkin . | |
| 3,699,999 | 10/1972 | Dunkelis | 137/493.4 |
| 3,939,866 | 2/1976 | Pignatelli | 137/493.4 |

FOREIGN PATENT DOCUMENTS

| | | | |
|---|---|---|---|
| 37793 | 12/1886 | Fed. Rep. of Germany | 137/493.4 |
| 954937 | 4/1964 | United Kingdom | 137/493.4 |

*Primary Examiner*—Robert G. Nilson

*Attorney, Agent, or Firm*—Jeffrey S. Mednick; Thomas R. FitzGerald

[57] ABSTRACT

A hydraulic system including at least one hydraulic cylinder is provided with an anti-cavitation and overload relief valve having a housing, a first chamber within the housing in fluid communication with one end of the cylinder, and a second chamber within the housing in fluid communication with a fluid reservoir. A fluid passageway within the valve housing connects the first and second chambers. A movable valve assembly is positioned within the fluid passageway for operating in a first mode to block fluid flow between the first and second chambers, for operating in a second mode to permit fluid flow from the first chamber to the second chamber only when the pressure in the first chamber exceeds the pressure in the second chamber by a first predetermined amount, and for operating in a third mode to permit fluid flow from the second chamber to the first chamber only when the pressure in the second chamber exceeds the pressure in the first chamber by a second predetermined amount. The valve includes a stationary portion positioned within the fluid passageway between the first and second chambers having a valve seat. The movable valve assembly includes a movable valve element having a sealing portion for engaging the valve seat of the stationary portion when the movable valve assembly is operating in the first and second modes. The movable valve assembly further has a valve seat and a poppet mechanism is provided for sealingly engaging the valve seat of the movable valve element when the movable valve assembly is operating in the first and third modes.

4 Claims, 3 Drawing Figures

ANTI-CAVITATION AND OVERLOAD RELIEF VALVE FOR A HYDRAULIC SYSTEM

BACKGROUND OF THE INVENTION

The present invention relates generally to hydraulic valves for use in fluid pressure operated systems and more particularly to hydraulic valves for the relief of both abnormally high and abnormally low pressure conditions in such systems.

A common problem in hydraulic circuits has been the provision of high pressure protection devices for venting fluid to a reservoir where the circuit is subjected to a higher pressure level than desired. Many devices have been utilized in the prior art for high pressure protection. Generally, these devices can be classified as either (1) direct-acting, utilizing a poppet loaded directly against a spring, or (2) pilot-operated, utilizing a poppet loaded by a reference pressure.

In addition to high pressure protection, the need has also existed for protection against abnormally low pressure conditions which result in cavitation. This condition exists when fluid leaves one side of a hydraulic cylinder and is not replaced at an equal rate on the opposite side. A known solution to the cavitation problem is the use of a one-way check valve which permits fluid to enter the voided cylinder from a reservoir and simultaneously prevents fluid from leaving the cylinder under pressure.

Therefore, complete protection of a hydraulic cylinder requires both high pressure protection and cavitation prevention on both cylinder ends. Combination valve assemblies providing both high and low pressure protection within a single package are also well known in the art. However, to date such combination assemblies have not performed as well as individual valve units due to the following problems: (1) To date, such combination valve assemblies have had to rely in part on dynamic sealing. The resulting seal friction has interferred with the performance of these valves. (2) Undue passageway restrictions, and (3) other problems resulting from limitations on the size of the valve package have limited performance.

SUMMARY OF THE INVENTION

Accordingly, a hydraulic system is provided with an anti-cavitation and overload relief valve having a housing, a first chamber within the housing in fluid communication with one end of the cylinder, and a second chamber within the housing in fluid communication with a fluid reservoir. A fluid passageway within the valve housing connects the first and second chambers. A movable valve assembly is positioned within the fluid passageway for operating in a first mode to block fluid flow between the first and second chambers, for operating in a second mode to permit fluid flow from the first chamber to the second chamber only when the pressure in the first chamber exceeds the pressure in the second chamber by a first predetermined amount, and for operating in a third mode to permit fluid flow from the second chamber to the first chamber only when the pressure in the second chamber exceeds the pressure in the first chamber by a second predetermined amount. The valve includes a stationary portion positioned within the fluid passageway between the first and second chambers having a valve seat. The movable valve assembly includes a movable valve element having a sealing portion for engaging the valve seat of the stationary portion when the movable valve assembly is operating in the first and second modes. The movable valve assembly further has a valve seat and a poppet mechanism is provided for sealingly engaging the valve seat of the movable valve element when the movable valve assembly is operating in the first and third modes.

OBJECTS OF THE INVENTION

An object of the present invention is the provision of a compact direct acting hydraulic valve for overload relief and cavitation protection of a hydraulic cylinder.

Another object of the present invention is the provision of an anti-cavitation and overload relief valve which exhibits low leakage properties without the use of dynamic seals.

A further object of the present invention is the provision of an anti-cavitation and overload relief valve which maintains pressure relatively constant as flow increases through the valve.

Still another object of the present invention is the provision of an anti-cavitation and overload relief valve which minimizes the stress on its component parts.

Still another object of the present invention is the provision of an anti-cavitation and overload relief valve which is simple in construction and therefore inexpensive to manufacture.

Other objects, advantages, and novel features of the present invention will become apparent from the following detailed description of the invention when considered in conjunction with the accompanying drawings.

DESCRIPTION OF THE PREFERRED EMBODIMENT

Figure 1:
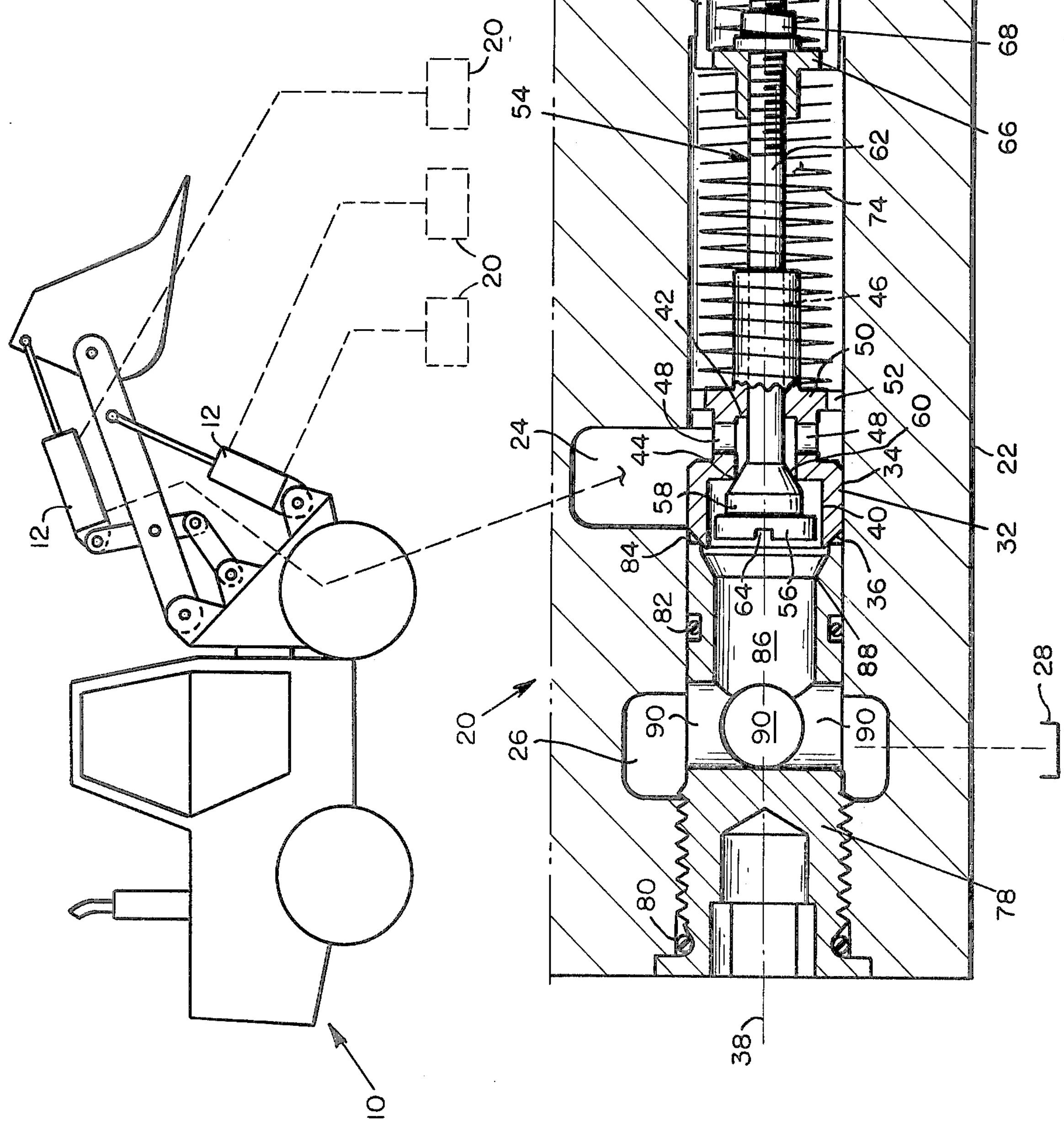
FIG. 1 shows a hydraulic system employing the hydraulic valve of the present invention, with the valve shown in partial longitudinal crosssection in a first operating mode.

FIG. 1 shows a hydraulic overload relief and anti-cavitation protection system for hydraulic equipment such as is found on a loader 10. The loader includes a plurality of hydraulic cylinders 12 with each end of each cylinder being connected to a hydraulic valve 20 of the present invention. For ease of illustration, only one such valve 20 has been illustrated in detail.

Each valve 20 includes a housing 22 which, typically, is also the housing for other valves utilized in the control of the hydraulic equipment. Each housing includes a first chamber 24 in fluid communication with one end of a hydraulic cylinder 12. Each housing 22 further includes a second chamber 26 in fluid communication with a reservoir, graphically illustrated at 28. Extending longitudinally the entire length of the valve is a central fluid passageway 30 which connects the first chamber 24 with the second chamber 26. A movable valve assembly, the operation of which will be described later, is contained entirely within the fluid passageway 30.

The movable valve assembly includes a movable valve element 32 having an outer surface 34 in sliding engagement with the fluid passageway 30 and a tapered sealing surface 36 on one end thereof. The movable valve element 32 further includes a hollow interior which is symmetrical about axis 38 and includes a first portion 40 axially adjacent the tapered end 36. A second interior portion 42 is axially adjacent the first interior portion 40 and has a diameter that is smaller than the diameter of the interior portion 40. The joint 44 between the first interior portion 40 and the second interior portion 42 defines a valve seat 44. The interior of the movable valve element 32 further includes a third portion 46 axially adjacent the portion 42 and having a diameter which is smaller than the diameter of the portion 42. The movable valve element 32 further includes a plurality of holes 48 in the outer wall surrounding the interior portion 42, for permitting fluid communication between the chamber 24 and the interior portion 42. The movable valve element 32 further includes a spring seat 50 projecting radially outwardly therefrom. The spring seat 50 includes a plurality of slots 52 therethrough to permit fluid communication along the passageway 30.

The movable valve assembly further includes a poppet mechanism having a poppet generally indicated at 54 which is substantially solid in cross-section and is substantially symmetrically disposed about the axis 38. The poppet 54 includes a head 56 at one end and a body portion 58 located axially adjacent the head 56 and having a diameter which is smaller than the diameter of the head 56. A tapered sealing portion 60 is axially adjacent the body portion 58 and is adapted to sealingly engage the valve seat 44 on movable valve element 32. The poppet 54 further includes a cylindrical stem 62 axially adjacent the tapered sealing portion 60. The cylindrical stem 62 is surrounded by the interior portion 46 of movable valve element 32 and is in sliding engagement therewith. The head 56 of poppet 54 includes a slot 64 for maintaining fluid communication between the chamber 24 and the chamber 26 after the poppet has reached its limit of travel. This function will become apparent in the discussion of the operation of the valve which follows.

The poppet mechanism further includes a spring seat 66 projecting radially outwardly from the stem 62. The seat 66 may be fastened to the stem 62 by any suitable means and in the preferred embodiment is threadingly engaged therewith. Accordingly, a lock nut 68 is provided to prevent any undesired rotation between the stem 62 and the spring seat 66. A biasing spring 70 is seated on one end against the end surface 72 of passageway 30 and is seated at the other end against one side of the spring seat 66. A second biasing spring 74 is positioned between the spring seat 50 and the other side of the spring seat 66. For reasons which will become apparent later the force transmitted by the spring 70 is less than the force transmitted by the spring 74. The spring seat 66 also includes slots 76 to permit fluid communication along the entire length of fluid passageway 30.

A stationary valve element 78 is positioned within the fluid passageway 30 and includes a portion thereof between chambers 24 and 26. The stationary valve element 78 may be integral with the housing 22, but is illustrated in the preferred embodiment as being threadingly engaged with the fluid passageway 30. A pair of static seals 80 and 82 and provided to prevent leakage of hydraulic fluid along the outer surface of stationary valve element 78.

The end of 84 of stationary valve element 78 provides a valve seat for the sealing surface 36 of movable valve element 34. The stationary valve element 78 includes a hollow interior portion including a portion 86 of reduced diameter relative to the diameter of valve seat 84. Accordingly, the tapered surface 88 provides a means for limiting the travel of the poppet 54. The stationary valve element 78 further includes a plurality of holes 90 for permitting fluid communication between the hollow interior of the element 78 and chamber 26.

Figure 2:
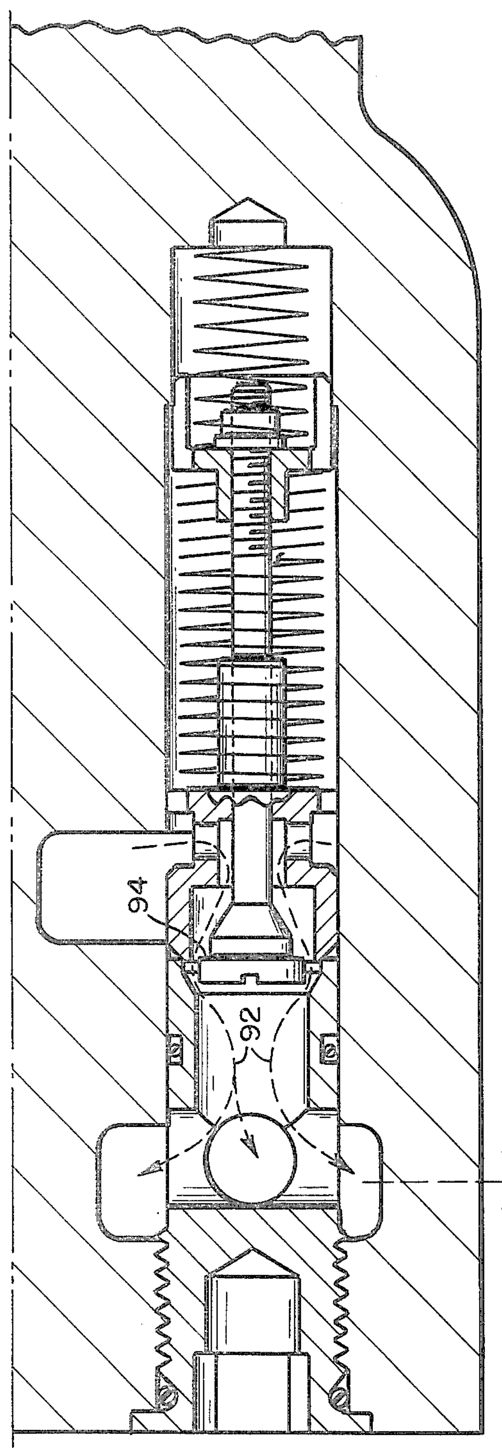
FIG. 2 shows the hydraulic valve shown in FIG. 1 in a second operating mode.
Figure 3:
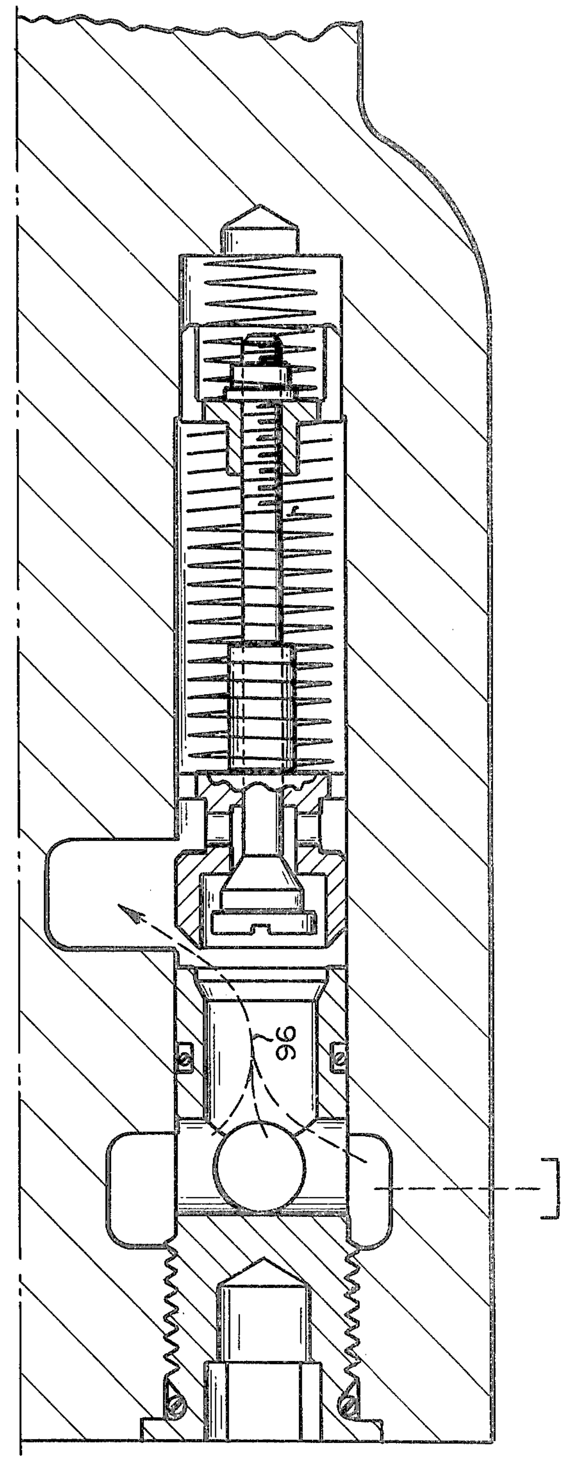
FIG. 3 shows the hydraulic valve shown in FIG. 1 in a third operating mode.

Referring to FIGS. 1 through 3 of the drawings, the operation of the valve of the present invention will be described in detail. Assuming first that the system shown in FIG. 1 is operating normally, that is, the pressure in the end of cylinder 12 to which the valve illustrated is connected is neither above nor below normal, the movable valve assembly will be positioned as illustrated in FIG. 1. In this position, sealing surface 36 is forced into sealing engagement with valve seat 84 by the force transmitted to the movable valve assembly by spring 70. Likewise, tapered sealing surface 60 of poppet 54 is forced into sealing engagement with valve seat 44 by spring 74. Thus, in this first operating mode fluid flow between chambers 24 and 26 is blocked in both directions.

Assume next that the pressure in the given cylinder end rises to a first predetermined amount which is above that desirable. This could occur, for example, if the boom of the vehicle were being hydraulically driven downward while the bucket was jammed in a fixed position. In this case, pressure will build up in chamber 24 and be applied against the tapered surface 60 of poppet 62 until the spring 74 starts to compress, as is illustrated in FIG. 2. The poppet 62 will not be unseated from valve seat 44 and will provide clearance for fluid flow to pass from chamber 24 along path 92 to chamber 26. As flow moves along path 92 it applies pressure against face 94 of head 56 and thus increases the compression load on spring 74. As flow increases, the compression load on spring 74 also increases thereby helping to maintain pressure fairly constant relative to increased flow. Spring 74 will continue to be compressed until head 56 abuts tapered surface 88. By providing a limit of travel for poppet 54, surface 88 prevents overstressing of the poppet mechanism. When the poppet head 56 is in contact with the surface 88, flow path 92 is maintained through slot 64. At this point further pressure regulation is sacrificed to prevent further stressing of the poppet mechanism. It should be noted that since flow path 92 is along the outer surface of poppet 54 no dynamic sealing is required. Such sealing is required when hollow poppets are utilized. Thus, in the second mode of operation fluid flow from chamber 24 to chamber 26 is permitted when the pressure in chamber 24 exceeds the pressure in chamber 26 by a first predetermined amount.

Assume next that the pressure in cavity 26 rises above the pressure in cavity 24. When the pressure in cavity 26 rises above the pressure in cavity 24 by a predetermined amount pressure builds up on the head 64 and the interior surface 40 of element 34 until poppet 54, movable valve element 34, spring 74 and spring seat 66 all move in unison to compress spring 70, as is illustrated in FIG. 3. As tapered sealing surface 36 is unseated from valve seat 84, fluid flows from chamber 26 to chamber 24 along path 96. Thus, in this third mode of operation fluid flow is permitted from chamber 26 to chamber 24 only when the pressure in the chamber 26 exceeds the pressure in chamber 24 by a second predetermined amount.

As is apparent from the above description, it is necessary that the spring 70 transmit less force than the spring 74 so that the operation of the valve is not symmetrical. In other words, the first predetermined amount referred to above must be considerably greater than the second predetermined amount since the valve should remain in the first operating mode shown in FIG. 1 throughout normal operating pressures but should be fairly sensitive to any situation in which the pressure in chamber 26 exceeds the pressure in chamber 24.

Thus, it is apparent that anti-cavitation and overload relief protection system for a hydraulic circuit has been provided which is both compact and direct acting. Furthermore, it is apparent that no dynamic seals are required in the operation of the valve of the present invention since flow in either direction is along the outside surface of the sealing member. The valve maintains a relatively constant pressure as flow increases over a large operating range. Additionally, the valve includes means for preventing overstressing of its internal parts. Finally, the construction of the valve of the present invention is relatively simple and therefore inexpensive.

While there has been described what is at present considered to be the preferred embodiment of the invention, it will be obvious to those skilled in the art that various changes and modifications may be made therein, without departing from the invention, and it is, therefore, aimed in the appendant claims to cover all such changes and modifications as fall within the true spirit and scope of the invention.

What we claim is:

1. In a hydraulic overload relief and anti-cavitation protection system for hydraulic equipment having a hydraulic cylinder; a hydraulic valve having a housing; a first chamber within said housing in fluid communication with one end of said hydraulic cylinder; a second chamber within said housing in fluid communication with a fluid reservoir; a fluid passageway within said housing connecting said first and second chambers; a movable valve assembly positioned within said fluid passageway for operating in a first mode to block fluid flow between said first and second chambers, for operating in a second mode to permit fluid flow from said first chamber to said second chamber only when the pressure in said first chamber exceeds the pressure in said second chamber by a first predetermined amount, and for operating in a third mode to permit fluid flow from said second chamber only when the pressure in second chamber exceeds the pressure in said first chamber by a second predetermined amount; and said valve having a stationary portion positioned within said fluid passageway between said first and second chambers, said stationary portion including a valve seat; said movable valve assembly including a movable valve element having a sealing portion for engaging said valve seat of said stationary portion when said movable valve assembly is operating in said first and second modes, said movable valve assembly further having a valve seat, and a poppet mechanism including a poppet for sealingly engaging said valve seat of said movable valve element when said movable valve assembly is operating in said first and third modes;

wherein said movable valve element further includes a hollow interior which is symmetrical about an axis, said interior having a first portion axially adjacent said sealing portion, a second portion axially adjacent said first portion and having a second diameter smaller than said first diameter, and a valve seat of said movable valve element being defined by the joint between said first and second interior portions, said poppet mechanism includes a poppet which is substantially solid in cross-section and is substantially symmetrical disposed about an axis, said poppet having a head located at one end thereof, a body portion adjacent said head having a diameter smaller than the diameter of said head, a tapered sealing portion adjacent said body portion for sealingly engaging said valve seat of said movable valve element, and a stem adjacent said tapered sealing portion, said stationary portion further includes a reduced diameter portion for engaging the head of the poppet in order to limit the travel thereof, and means for maintaining fluid communication between said first and second chamber when the poppet engages the reduced diameter portion.

2. The invention of claim 1 wherein the means for maintaining fluid communication comprises a slot in the head of said poppet.

3. In a hydraulic valve having a housing; a first chamber within said housing, adapted to be communicated with a fluid line; a second chamber within said housing, adapted to be communicated with a fluid reservoir; a fluid passageway within said housing connecting said first and second chambers; a movable valve assembly positioned within said fluid passageway for operating in a first mode to block fluid flow between said first and second chambers, for operating in a second mode to permit fluid flow from said first chamber to said second chamber only when the pressure in said first chamber exceeds the pressure in said second chamber by a first predetermined amount, and for operating in a third mode to permit fluid flow from said second chamber to said first chamber only when the pressure in said second chamber exceeds the pressure in said first chamber by a second predetermined amount, and said valve having a stationary portion positioned within said fluid passageway between said first and second chambers, said stationary portion including a valve seat; said movable valve assembly including a movable valve element having a sealing portion for engaging said valve seat of said stationary portion when said movable valve assembly is operating in said first and second modes, said movable valve assembly further having a valve seat, and a poppet mechanism for sealingly engaging said valve seat of said movable element when said movable valve assembly is operating in said first and third modes, said poppet mechanism including a poppet having a head located at one end thereof, a body portion adjacent said head, a tapered sealing portion adjacent said body portion for sealingly engaging said valve seat of said movable valve element, and a stem adjacent said tapered sealing portion, wherein said poppet mechanism further includes a first spring seat projecting radially outwardly from the stem of said poppet and wherein said movable valve assembly includes first spring bias means seated against one side of said first spring seat for biasing said sealing portion of said movable valve element into sealing engagement with said valve seat of said stationary portion.

4. A hydraulic valve as defined in claim 3 wherein said movable valve element includes a second spring seat projecting radially outwardly therefrom and wherein said movable valve assembly includes a second spring biasing means positioned between said second spring seat and the other side of said first spring seat for biasing said tapered sealing portion of said poppet into said sealing engagement with said valve seat of said movable valve element.

* * * * *